United States Patent [19]

Uemiya et al.

[11] Patent Number: 5,798,033
[45] Date of Patent: Aug. 25, 1998

[54] PROCESS FOR PREPARING POROUS METALLIC BODY AND POROUS METALLIC BODY FOR BATTERY ELECTRODE SUBSTRATE PREPARED THEREFROM

[75] Inventors: Takafumi Uemiya; Hitoshi Tsuchida; Masayuki Furukawa; Kazuo Yamazaki, all of Shinminato; Tadashi Dohi, Ohtsu, all of Japan

[73] Assignees: Sumitomo Electric Industries, Ltd.; Sumitomo Electric Industries Toyama Co., Ltd.; Nippon Graphite Industries, Ltd., all of, Japan

[21] Appl. No.: 725,851

[22] Filed: Oct. 4, 1996

[30] Foreign Application Priority Data

Oct. 6, 1995 [JP] Japan ................. 7-260118

[51] Int. Cl.$^6$ .................. C25D 5/54; C25D 5/56
[52] U.S. Cl. .................. 205/161; 205/164
[58] Field of Search .................. 429/245; 205/158, 205/161, 164

[56] References Cited

U.S. PATENT DOCUMENTS 5,432,031  7/1995  Teraoka et al. ................. 429/223

FOREIGN PATENT DOCUMENTS 3645159   12/1961   Japan.
57-174484 10/1982   Japan.
6-122994  5/1994    Japan.

Primary Examiner—Kathryn L. Gorgos
Assistant Examiner—Edna Wong
Attorney, Agent, or Firm—Bierman, Muserlian and Lucas

[57] ABSTRACT

A process for preparing a porous metallic body comprising the steps of: rendering a porous resin body electrically conductive, electroplating the conductive resin, and heating the electroplated resin to remove the resin, wherein the step of rendering the resin electrically conductive is conducted by coating the resin with a coating composition containing amorphous carbon particles as a conductive material. In the process, substantially spherical carbon particles may be used as the conductive material. The substantially spherical carbon particles are still preferably amorphous carbon. The thus obtained porous metallic body has reduced defect and more smooth skeleton in the porous body, is less likely to cause stress concentration upon application of bending and tensile force, has lower carbon content, and superior mechanical strength, and, therefore, the substrate is suitable as an electrode substrate for batteries.

4 Claims, 2 Drawing Sheets

PROCESS FOR PREPARING POROUS METALLIC BODY AND POROUS METALLIC BODY FOR BATTERY ELECTRODE SUBSTRATE PREPARED THEREFROM

BACKGROUND OF THE INVENTION

1. Field of the Invention

This invention relates to a process for preparing a porous metallic body for use in alkaline batteries, such as a nickel/metal hydride battery, and an electrode for batteries using the same.

2. Description of the Prior Art

A porous resin body, such as a resin foam, a nonwoven fabric of a resin, a resin felt, or a resin mesh, has hitherto been coated with a coating composition with fine particles of natural graphite being dispersed therein, followed by drying to render the porous resin body electrically conductive, thus enabling the porous resin body to be electro-plated. One example of this technique is described in Japanese Patent Publication No. 38-17554. In addition, there are other various techniques for imparting an electrically conductive property to a resin, such as electroless plating and vapor deposition of a metal, and these techniques have become put to practical use.

Among the prior art techniques which have been put to practical use, a process for preparing a porous metallic body wherein a coating composition with fine particles of natural graphite being dispersed therein is applied to a porous resin body is extensively used in the art. In the porous metallic body prepared by this process, particularly when a nonwoven fabric is used as the porous resin body, since resin fibers 1 constituting the nonwoven fabric has a circular section, the deposition of fine natural graphite particles 2 in a plate crystal form result in point contacts of the fine particles 2 with the section of the resin fibers 1 as shown in FIG. 1A, so that the deposited particles 2 are likely to come off from the resin fibers 1. For this reason, at the time of plating, a metal cannot be deposited on the area from which the graphite particles have come off, thus inducing defects. Very small defects can disappear by taking advantage of the thickness of the plating. However, when the natural graphite comes off in a continuous area, a large defect is created. Further, a conductor of graphite in a plate crystal form is deposited on the circular section by plating, resulting in the formation of a plating in a step form. After a porous metallic body is prepared from this plated porous resin body, this unfavorably leads to stress concentration upon application of a load.

After the plating, the natural graphite, together with the resin, is burned off. In this case, the pyrolytic temperature of the graphite is so high that the incineration temperature should be high, which is uneconomical.

SUMMARY OF THE INVENTION

Under these circumstances, an object of this invention is to provide a process for preparing a porous metallic body which has no defect and a smooth metallic surface, is less likely to cause stress concentration, has a low carbon content and possesses excellent mechanical strength.

As a result of extensive and intensive studies, the present inventors have found that, the adoption of amorphous carbon particles or substantially spherical carbon particles as a conductive material in the step of rendering a porous resin body electrically conductive is effective, which has led to the completion of this invention. Thus, this invention relates to:

(1) a process for preparing a porous metallic body comprising the steps of: rendering a porous resin body electrically conductive, electroplating the conductive resin, and heating the electroplated resin to remove the resin, wherein the step of rendering the resin electrically conductive is conducted by coating the resin with a coating composition containing amorphous carbon particles as a conductive material;

(2) a process for preparing a porous metallic body comprising the steps of: rendering a porous resin body electrically conductive, electroplating the conductive resin, and heating the electroplated resin to remove the resin, wherein the step of rendering the resin electrically conductive is conducted by coating the resin with a coating composition containing substantially spherical carbon particles as a conductive material; and (3) a porous metallic body for an electrode substrate of a battery which has been produced by any one of the foregoing processes and have a carbon content of not more than 0.2% by weight.

DETAILED DESCRIPTION OF THE PREFERRED EMBODIMENTS

Figure 1A:
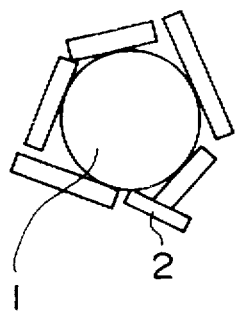
FIGS. 1A to 1C are schematic diagrams showing the state of deposition of a conductive material on the section of a resin fiber.
Figure 1B:
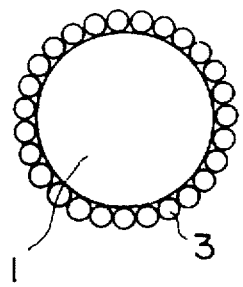
Figure 1C:
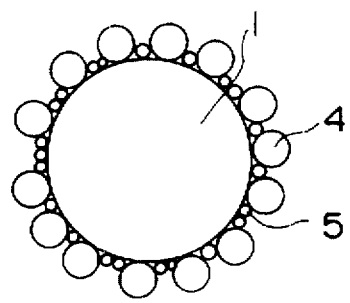

FIGS. 1B–1C are schematic diagrams illustrating the principle of this invention. For facilitating the understanding of this invention, a nonwoven fabric will be taken as an example of the porous resin body to demonstrate that a conductive material can be densely deposited onto fibers constituting the nonwoven fabric. Therefore, it is needless to say that not only the nonwoven fabric but also other conventional porous resin bodies can be used in this invention.

As already described above, FIG. 1A illustrates the use of graphite as a conventional conductive material, and, in this case, fine graphite particles 2 in a plate crystal form come into point contact with the section of a resin fiber 1, so that the deposited fine particles are likely to come off from the fiber and, due to this unfavorable phenomenon, at the time of plating, a metal cannot be deposited on the area from which the graphite particles have come off, thus creating defects in the resultant porous metallic body.

By contrast, in the case of the amorphous carbon used in the present invention, even when the amorphous carbon comes into point contact with fibers, the binding force between amorphous carbon particles is so high that upon adhesion to the porous resin body, the particles are adhered to one another, permitting the particles to be less likely to come off from the fiber. When the particles are substantially spherical carbon particles 3, as shown in FIG. 1B, the surface of the fiber 1 can be fully covered with the particles 3. In this case, when the coated nonwoven fabric is plated in this state, a smooth plating layer can be formed, so that the stress concentration is less likely to occur. Therefore, the use of carbon particles, which are amorphous and, at the same time, spherical, can offer better results.

The diameter of the carbon particles used in the present invention is 0.01 to 5 µm, preferably 0.01 to 0.5 µm. Further, as shown in FIG. 1C, when large-diameter carbon particles 4 and small-diameter carbon particles 5 are used in combination, the small-diameter particles 5 are entrapped between the large-diameter particles 4, permitting the carbon particles to be more densely deposited onto the surface of the porous resin body. This in turn increases the density of the carbon particles to enhance the conductivity, which is advantageous also in plating. In this case, preferably, the diameter of the small-diameter carbon particles 5 is 0.01 to 0.5 μm, and the diameter of the large-diameter carbon particles 4 is 1 to 5 μm. The weight ratio (volume ratio) is preferably large-diameter particle:small-diameter particle=(0 to 90):(100 to 10).

In the present invention, the coating composition for imparting an electrically conductive property to a porous resin body in the step of rendering the porous resin body electrically conductive usually comprises a synthetic resin, the above carbon particles, a diluent and the like. If necessary, a metal powder may be incorporated into the coating composition. The incorporation of the metal powder results in further enhanced conductivity. In this case, since the metal powder is composed of large particles and corresponds to the large-diameter particles shown in FIG. 1C, the amount of the metal powder incorporated is preferably not more than 20% by weight based on the weight of the carbon particles. The metal constituting the metal powder may be identical to that used in plating. For example, in the case of a porous Ni body, the use of a Ni powder poses no concomitant problem during or after plating. Similarly, a graphite powder may be added in an amount of not more than 20% by weight based on the weight of the carbon particles. Also in this case, the carbon particles are entrapped between the fine natural graphite particles 2 and the resin fiber 1 shown in FIG. 1A, offering the effect of enhancing the adhesion and, at the same time, of improving the conductivity. However, when the graphite powder is used, the addition of $NaHCO_3$ as a combustion aid at the time of incineration of the resin after the plating is preferred from the viewpoint of lowering the combustion temperature.

Dissolving the resin used in the coating composition in a solvent permits the control of the viscosity and concentration. In this case, the resin used is preferably such that carbon is not left at the time of incineration after the plating, neither benzene nucleus nor double bond is present in the skeleton of the resin and oxygen is present. Specifically, cellulose and acrylic ester resins are preferred.

The conductive porous resin body prepared by the above method is then electroplated. There is no particular limitation on electroplating, and conventional electroplating methods described in, for example, Japanese Patent Publication No. 57-39317 may be used. After the plating, the resin and the carbon component may be then burned out in a reducing atmosphere to prepare a porous metallic body. In the case of the porous metallic body thus prepared by the process according to the present invention, the content of the carbon in the metallic structure per se is low and not more than 0.2% by weight. Therefore, the porous metallic body has excellent mechanical strength and high bending and tensile strength. The structure has no defect, and the surface of the plating is smooth, rendering the porous metallic body suitable for use as an electrode substrate for batteries.

The present invention will now be described in more detail with reference to the following Examples.

EXAMPLE 1

100 g of a carbon black as an amorphous carbon having a particle diameter of 0.01 to 0.2 μm was dispersed in 0.5 liter of a 10% aqueous acrylic ester resin solution to prepare a coating composition in this mixing ratio.

A urethane resin foam, with the number of interconnecting pores per 1 inch being 50, having a thickness of 1.4 mm, a width of 500 mm, and a length of 100 m was provided, continuously immersed in the above coating composition, and subjected to roll squeezing, and dried, thus rendering the urethane resin foam electrically conductive. In this case, the amount of the carbon black deposited per 1 $m^2$ of the resin foam was 50 g. The resin foam, which had been rendered electrically conductive, was continuously electroplated with Ni and heat-treated at 1000° C. for 11 min in a hydrogen gas stream, thereby preparing a porous body of Ni metal. The weight of the metal per unit area was 550 $g/m^2$.

Test pieces were taken off from the porous metallic body thus obtained, and physical properties of the test pieces were measured by the following methods.

A) Carbon content: Determined by the infrared absorbing analysis method.

B) Tensile strength: Five test pieces having 15 mm in width×150 mm in length were punched parallel to the plating direction, and the tensile strength was measured under conditions of gauge length 100 mm and tensile rate 10 mm/min.

C) Elongation: Elongation at break in the above tensile test.

The results are given in Table 1 (No. 1) and Table 2 (No. 1).

EXAMPLES 2 TO 9

Coating compositions were prepared in the same manner as in Example 1,except that conductive materials (Nos. 2 to 9) listed in Table 1 were used in the given percentages based on the weight of carbon particles. Using these coating compositions, the same treatments as described in Example 1 were carried out to prepare porous metallic bodies listed in Table 2 (Nos. 2 to 9). The results regarding the measurements of the physical properties of the resultant porous metallic bodies are summarized in Table 2.

COMPARATIVE EXAMPLES 1 AND 2

Porous metallic bodies were prepared in the same manner as in Example 1, except that coating compositions using conductive materials (Nos. 10 and 11) listed in Table 1 were used. The physical properties of the porous metallic bodies were measured, and the results thereof are summarized in Table 2. Comparison of the examples of this invention with the comparative examples with respect to the same raw material reveals that, in the examples of the present invention, an improvement in elongation at break was observed over that in the comparative examples, although the improvement in the tensile strength was slight. In particular, it should be noted that, in the examples of the present invention, a marked reduction in carbon content was observed over the carbon content in the comparative examples.

EXAMPLE 10

An experiment on batteries using the porous metallic bodies prepared above was carried out as follows. The porous metallic bodies of Example 1 and Comparative Example 1 were each cut into a size of 33 mm×200 mm to prepare electrode substrates which were then packed with an active material comprising 88% by weight of nickel hydroxide, 7% by weight of metallic cobalt, 2% by weight of cobalt hydroxide, and 3% by weight of zinc oxide to prepare positive electrodes for an alkaline battery. Negative electrodes were prepared by packing the porous metallic bodies, as the electrode substrate, of Example 1 and Comparative Example 1 with an active material composed mainly of a metal hydride alloy of $MmNi_{0.5}Mn_{0.4}Al_{0.3}Co_{0.5}$ wherein Mm represents a mischmetal. These positive and negative electrodes, a separator formed of a sulfonated polypropylene nonwoven fabric, and an aqueous potassium hydroxide solution having a specific gravity of 1.2 as an electrolyte were used to prepare nickel/metal hydride batteries each having a diameter of 22.5 mm and a height of 49.2 mm.

Figure 2:
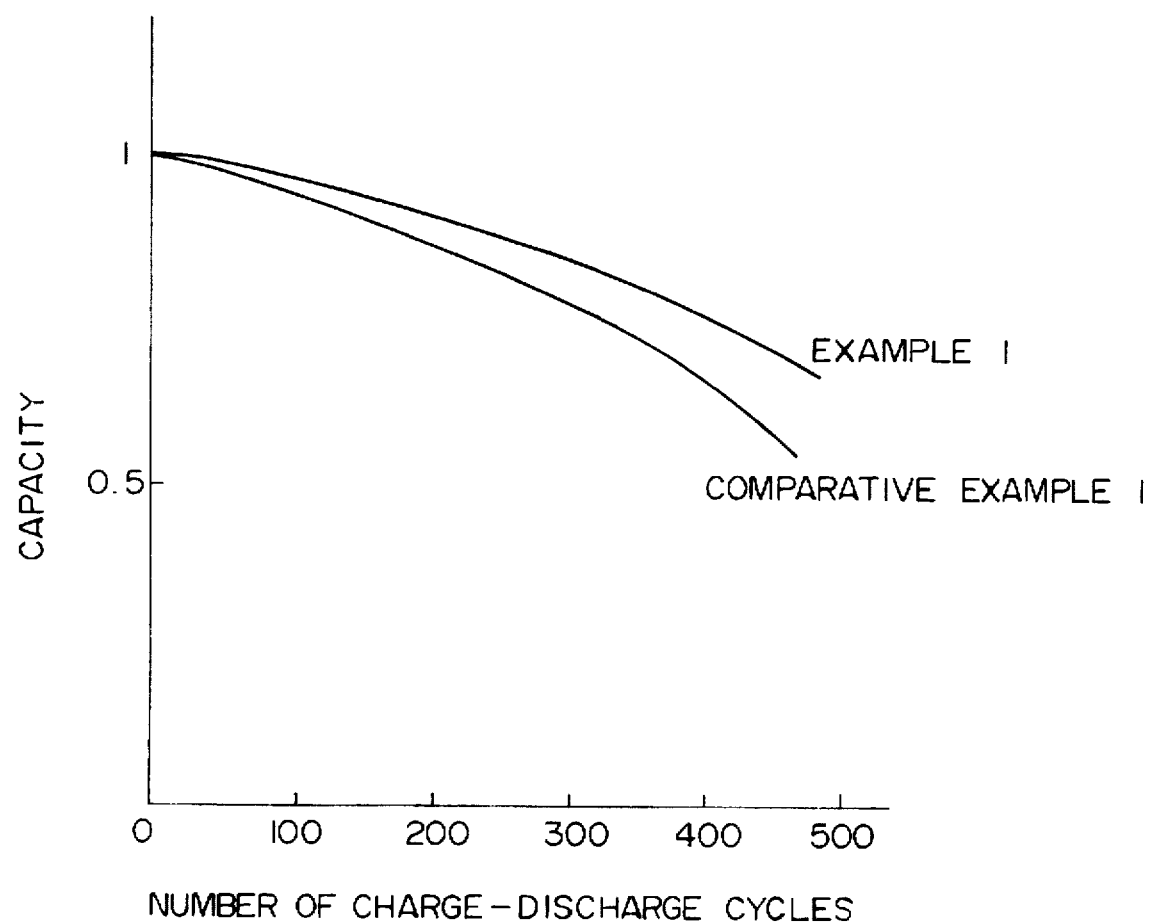
FIG. 2 is a graph showing the results of a charge-discharge cycle test for a battery using the porous metallic body according to the present invention.

Batteries respectively using the porous metallic bodies of Example 1 and Comparative Example 1 were tested on a change in capacity under conditions of one hour rate (1 C) charge-discharge cycle. The results are shown in FIG. 2. From FIG. 2, it is apparent that, as compared with the battery using the comparative porous metallic body, the battery using the porous metallic body according to the present invention exhibited smaller change in capacity and longer service life.

The porous metallic body prepared by the process according to the present invention, as compared with the porous metallic body prepared by the conventional process, has reduced defect and more smooth skeleton in the porous body, is less likely to cause stress concentration upon application of bending and tensile force, has lower carbon content, and superior mechanical strength. Therefore, the porous metallic body prepared according to the present invention is suitable as an electrode substrate for batteries.

What is claimed is:

1. A process for preparing a porous metallic body comprising the steps of: rendering a porous resin body electrically conductive, electroplating the conductive resin, and heating the electroplated resin to remove the resin, wherein the step of rendering the resin electrically conductive is conducted by coating the resin with a coating composition containing a conductive material consisting of (a) amorphous carbon particles and (b) a metal powder or a graphite powder in an amount of not more than 20% by weight based on the weight of the amorphous carbon particles.

2. A process for preparing a porous metallic body comprising the steps of: rendering a porous resin body electri-

TABLE 1

| | Conductive material | | | | | | | |
|---|---|---|---|---|---|---|---|---|
| | Carbon Particles | | | Metal powder | | | Natural graphite | |
| No. | Crystallinity | Form | Diameter (μm) | Kind | Diameter (μm) | wt % | Diameter (μm) | wt % |
| 1 | Amorphous | Indefinite | 0.01–0.2 | — | — | — | — | — |
| 2 | Amorphous | Substantially spherical | 0.01–0.2 | — | — | — | — | — |
| 3 | Amorphous | Substantially spherical | 0.05–0.5 | — | — | — | — | — |
| 4 | Amorphous | Substantially spherical | 0.05–0.5 | Ni | 0.1–0.5 | 10 | — | — |
| 5 | Amorphous | Substantially spherical | 0.05–0.5 | Ni | 0.1–0.5 | 20 | — | — |
| 6 | Amorphous | Substantially spherical | 0.05–0.5 | — | — | — | 0.1–0.3 | 10 |
| 7 | Amorphous | Substantially spherical | 0.05–0.5 | — | — | — | 0.1–0.3 | 20 |
| 8 | Amorphous Amorphous | Substantially spherical Substantially spherical | 0.01–0.2 1–5 | — | — | — | — | — |
| 9 | Amorphous | Substantially spherical | 0.01–0.2 | — | — | — | — | — |
| 10 | — | — | — | — | — | — | 0.1–3 | 100 |
| 11 | — | — | — | — | — | — | 0.1–3 | 100 |

Resin used in coating compositions: acrylic ester
No. 10: Comparative Example 1
No. 11: Comparative Example 2

TABLE 2

| No. | Porous resin body | Weight of Ni plating per unit area (g/m²) | Carbon content (wt %) | Tensile strength (kg/20 mm) | Elongation (%) |
|---|---|---|---|---|---|
| 1 | Urethane foam | 550 | 0.021 | 5.1 | 5.5 |
| 2 | Urethane foam | 550 | 0.031 | 5.2 | 4.8 |
| 3 | Urethane foam | 550 | 0.042 | 5.2 | 4.7 |
| 4 | Urethane foam | 550 | 0.020 | 5.1 | 5.2 |
| 5 | Urethane foam | 550 | 0.022 | 5.2 | 5.1 |
| 6 | Urethane foam | 550 | 0.060 | 5.1 | 4.8 |
| 7 | Urethane foam | 550 | 0.070 | 5.1 | 4.7 |
| 8 | Urethane foam | 550 | 0.022 | 5.3 | 5.7 |
| 9 | Nonwoven fabric of polyester | 550 | 0.021 | 5.3 | 5.2 |
| 10 | Urethane foam | 550 | 0.68 | 5.1 | 4.4 |
| 11 | Nonwoven fabric of polyester | 550 | 0.67 | 4.8 | 4.0 |

No. 10: Comparative Example 1
No. 11: Comparative Example 2 cally conductive, electroplating the conductive resin, and heating the electroplated resin to remove the resin, wherein the step of rendering the resin electrically conductive is conducted by coating the resin with a coating composition containing a conductive material consisting of (a) substantially spherical amorphous carbon particles and (b) a metal powder or a graphite powder in an amount of not more than 20% by weight based on the weight of the substantially spherical amorphous carbon particles.

3. The process according to claim 2, wherein the substantially spherical carbon particles have a diameter of 0.01 to 0.5 μm.

4. The process according to claim 2, wherein the substantially spherical carbon particles are a mixture of particles having a diameter of 0.01 to 0.5 μm and particles having a diameter of 1 to 5 μm.

* * * * *